Jan. 19, 1926.
J. J. JACOBS ET AL
1,570,305
LUBRICATING APPARATUS
Filed Nov. 10, 1924
FIG. 1
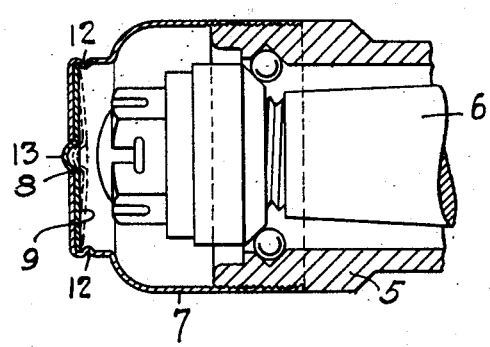
FIG. 2
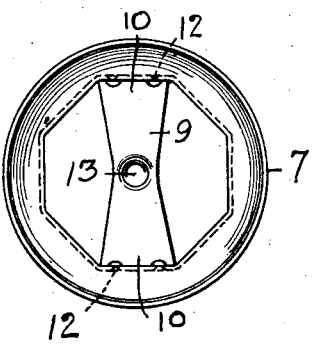
FIG. 5
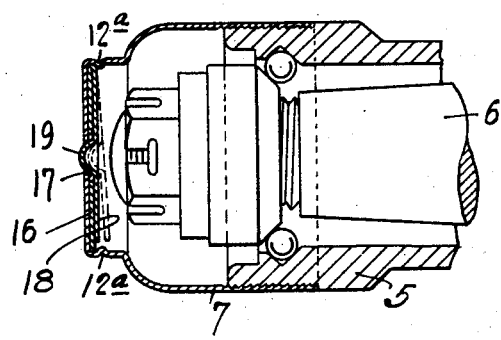
FIG. 7
FIG. 3
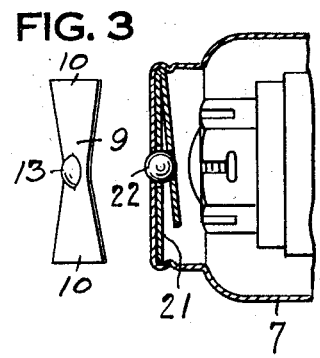
FIG. 4
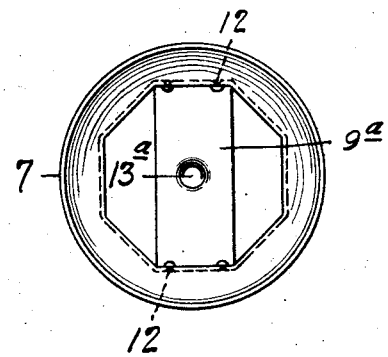
FIG. 6
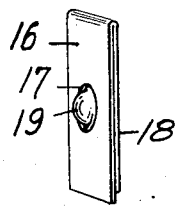
INVENTORS
Rolla B. Bostwick
James J. Jacobs
By Ray, Totten & Martin,
Attorneys.

Patented Jan. 19, 1926.

1,570,305

UNITED STATES PATENT OFFICE.

JAMES J. JACOBS AND ROLLA B. BOSTWICK, OF DUQUESNE, PENNSYLVANIA.

LUBRICATING APPARATUS.

Application filed November 10, 1924. Serial No. 748,994.

*To all whom it may concern:*

Be it known that we, JAMES J. JACOBS and ROLLA B. BOSTWICK, citizens of the United States, and residents of Duquesne, in the county of Allegheny and State of Pennsylvania, have invented a new and useful Improvement in Lubricating Apparatus, and we do hereby declare the following to be a full, clear, and exact description thereof.

Our invention relates to lubricating apparatus, and particularly to means for conveniently applying lubricants to automobile wheels and the like without removing the hub cap.

One object of our invention is to provide an improved arrangement whereby grease or other lubricant may be inserted within the hub of a wheel without removing the hub cap, and while revolving the wheel to evenly distribute the grease therein.

Another object resides in providing an improved sealing device for the opening through which the lubricant is introduced into the hub cap.

Some of the forms which our invention may take are shown in the accompanying drawing wherein Fig. 1 is a sectional view showing our invention applied to the hub cap of an automobile wheel; Fig. 2 is an end elevational view of a portion of the apparatus of Fig. 1; Fig. 3 is a detail view of the form of closure plate shown in Fig. 2; Fig. 4 is a detail view showing another form of closure plate which we may employ; Fig. 5 shows still another form of spring plate in place in a hub cap; Fig. 6 is a detail view more clearly showing the form of the plate of Fig. 5, and Fig. 7 shows still another form of spring and closure member for a perforated hub cap.

A wheel hub 5 is mounted for rotative movement upon an axle 6 in the usual manner and is provided with a hub cap 7 such as usually formed of pressed metal. An opening 8 is provided centrally of the cap 7 so that the lubricant may be introduced into said cap without unscrewing it from the hub. A flat spring 9 having widened ends 10 is seated between two of the octagonal sides of the end of the hub cap, thus being held against rotative movement relative to the hub cap. The hub cap is indented slightly as indicated at 12 so that the ends of the plate 9 are held against the end wall of the hub cap.

The plate 9 is provided with a protuberance 13 that extends through the opening 8 and normally seals the same against the passage of moisture or dirt. Grease is inserted through the opening 8, preferably by placing the nozzle of a grease gun or the like against the protuberance 13 and depressing the same so that the nozzle will seat within the circular opening 8. This movement also pushes the mid portion of the spring plate 9 inwardly and permits the introduction of grease into the hub cap upon operation of the grease gun. Owing to the central location of the opening 8 and its circular form, the wheel may be rotated while the grease is being applied, thus insuring an even distribution throughout the interior of the hub.

In Fig. 4 we have shown a somewhat different form of spring plate 9ª. This plate is provided with a protuberance 13ª and seats within the end of the hub cap in substantially the same manner as does the plate 9. As the plate 9ª has greater width at its mid portion than the plate 9, it may be made of light material and still possess strength equal to that of the plate 9. The plates 9 and 9ª may be made of phosphor-bronze or any spring-like material which is preferably non-corrodible.

Referring now to Figs. 5 and 6, it will be seen that we provide a spring plate having a body portion 16 that is perforated at 17 and a bent-over portion 18 that has a protuberance 19 normally seating within the opening 17 to seal the same. When the nozzle of the oil can or the like is pressed against the protuberance 19, the portion 18 will be forced inward as indicated in dotted lines in Fig. 5, to admit oil to the interior of the hub cap. The advantage of this form of structure resides in the fact that the portion 16 is not bent or distorted and therefore in no danger of being forced from its seat behind the depressions 12ª. Furthermore less resistance to inward movement is offered by the portion 18 than by the spring plates 9, while at the same time it is effective as a check valve to prevent lubricant from flowing back through the opening 17.

In Fig. 7 we show the hub cap provided with an opening as in the other figures, but instead of the spring arm 16 of Fig. 6 we employ a spring arm 21 of the same general form, and instead of providing the shorter leg thereof with a protuberance, such leg is provided with an opening of substantially the same diameter as the opening in the end of the hub cap. A ball check 22 seats within these openings but is of a diameter too great to permit its passage through either of them. An opening is provided in the longer leg of the spring arm 21 of such size that the ball may pass therethrough freely.

The advantage of this device resides in the fact that the opening in the hub cap is more likely to be completely sealed under abnormal conditions, such as inaccuracy of mounting, distortion, or displacement of some of the parts. In other words, the ball will be forced snugly to its seat in the opening in the end of the hub cap under conditions wherein the protuberance 19 of Fig. 6 or the protuberance 13 of Fig. 1 would not completely close the opening.

Various changes in detail and general arrangement may be made without departing from the spirit and scope of the invention as defined in the accompanying claims.

We claim as our invention:

1. The combination with a wheel hub having a lubricant recess therein and provided with a cap which has an opening disposed centrally thereof, of a flat spring seated in the end of said cap, and a closure element carried by said spring in position to extend into said opening, the ends of the spring being held against movement axially of the hub by indentations arranged circumferentially in said cap.

2. The combination with a wheel hub having a lubricant recess therein and provided with a cap which has an opening disposed centrally thereof, of a flat spring seated in the end of said cap and having a protuberance extending through said opening, the ends of the spring being held against movement axially of the hub by indentations arranged circumferentially in said cap.

3. The combination with a wheel hub having a lubricant recess therein and provided with a hub cap whose outer end is of polygonal form and which is provided with a perforation, of a spring plate disposed across said perforation, the plate having its ends fitting in the oppositely disposed polygonal sides of the hub cap and provided with a protuberance extending through said opening.

4. The combination with a wheel hub having a lubricant recess therein and provided with a hub cap whose outer end is of polygonal form and which is provided with a perforation, of a spring plate disposed across said perforation and having its ends fitting in the oppositely disposed polygonal sides of the hub cap and provided with a protuberance extending through said opening, the ends of said spring being held in position axially of the hub cap by means if indentations formed in said cap.

5. The combination with a wheel hub having a lubricant recess therein and provided with a hub cap whose outer end is of polygonal form and which is provided with a perforation, of a spring plate disposed across said perforation, and having its ends fitting in oppositely disposed polygonal sides of the hub cap and provided with a protuberance extending through said opening, the ends of said spring being held in position axially of the hub cap by means of indentations formed in said cap and the spring being of reduced width adjacent to said protuberance.

In testimony whereof we, the said ROLLA B. BOSTWICK and JAMES J. JACOBS, have hereunto set our hands.

ROLLA B. BOSTWICK.
JAMES J. JACOBS.